United States Patent
Liang et al.

(10) Patent No.: US 12,055,985 B2
(45) Date of Patent: Aug. 6, 2024

(54) FIXING ASSEMBLY AND ELECTRONIC DEVICE

(71) Applicant: WISTRON CORP., New Taipei (TW)

(72) Inventors: Haibo Liang, New Taipei (TW); Qi Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 152 days.

(21) Appl. No.: 17/583,252

(22) Filed: Jan. 25, 2022

(65) Prior Publication Data

US 2023/0103238 A1 Mar. 30, 2023

(30) Foreign Application Priority Data

Sep. 29, 2021 (CN) .......................... 202111151429.7

(51) Int. Cl.
*G06F 1/18* (2006.01)
(52) U.S. Cl.
CPC .............. *G06F 1/185* (2013.01); *G06F 1/181* (2013.01)
(58) Field of Classification Search
CPC ..................................................... H05K 5/00
See application file for complete search history.

(56) References Cited

U.S. PATENT DOCUMENTS

| 4,521,821 A * | 6/1985 | Kobayashi ............. G11B 15/10 360/137 |
| 2009/0080171 A1 | 3/2009 | Peng |
| 2015/0146372 A1 * | 5/2015 | French, Jr. ........... H05K 7/1489 29/854 |
| 2017/0069985 A1 * | 3/2017 | Schulze .................. G06F 1/183 |

FOREIGN PATENT DOCUMENTS

TW 200936013 A 8/2009

OTHER PUBLICATIONS

Chinese Language Office Action issued by the TIPO on May 20, 2022.

* cited by examiner

*Primary Examiner* — Jerry Wu
(74) *Attorney, Agent, or Firm* — McClure, Qualey & Rodack, LLP

(57) ABSTRACT

A fixing assembly is adapted to be disposed on a support frame and a plate part of a casing. The support frame is disposed on the plate part. The fixing assembly includes a contact component, at least one stopper, and a trigger. The contact component is adapted to be movably disposed on the plate part. The stopper is movably disposed on the plate part and movable by the contact component. The trigger is configured to configured to penetrate through the support frame to push the contact component so as to force the at least one stopper to move away from the plate part.

18 Claims, 11 Drawing Sheets

FIXING ASSEMBLY AND ELECTRONIC DEVICE

CROSS-REFERENCE TO RELATED APPLICATIONS

This non-provisional application claims priority under 35 U.S.C. § 119(a) on Patent Application No(s). 202111151429.7 filed in China on Sep. 29, 2021, the entire contents of which are hereby incorporated by reference.

TECHNICAL FIELD

The disclosure relates to a fixing mechanism, more particularly to a fixing assembly and an electronic device including the same.

BACKGROUND

Servers can provide various functionalities, such as sharing, storing, analyzing data, or performing computation, and therefore are considered as the foundation for offering cloud services. As the cloud grows rapidly, servers are demanded to process massive amounts of data efficiently.

Thus, it is desired to improve and add high-end computer components to the limited internal space of the exterior housing. This leads to a compact layout of components and complicates the relevant works, such as installation, removal, and maintenance. Meanwhile, the fixation of conventional components has relied on fasteners, such as screws or bolts. For example, a circuit board that is used for connecting to a power supply is fixed in place using specific screws or bolts with the use of hand or power tool and thus resulting in troublesome and inefficient installation, removal, and maintenance works.

SUMMARY

Accordingly, the present disclosure provides a fixing assembly and an electronic device that allows the installation and removal of associated components without the use of hand or power tools.

One embodiment of the disclosure provides a fixing assembly adapted to be disposed on a support frame and a plate part of a casing. The support frame is disposed on the plate part. The fixing assembly includes a contact component, at least one stopper, and a trigger. The contact component is adapted to be movably disposed on the plate part. The at least one stopper is adapted to be movably disposed on the plate part and is movable by the contact component. The trigger is configured to penetrate through the support frame to push the contact component so as to force the at least one stopper to move away from the plate part.

Another embodiment of the disclosure provides an electronic device. The electronic device includes a casing and a fixing assembly. The casing includes a support frame and a plate part. The support frame is disposed on the plate part. The support frame is disposed on the plate part. The fixing assembly includes a contact component, at least one stopper, and a trigger. The contact component is movably disposed on the plate part. The at least one stopper is movably disposed on the plate part and is movable by the contact component. The trigger is configured to push the contact component so as to force the at least one stopper to move away from the plate part.

According to the fixing assembly and the electronic device as discussed in the above embodiments of the disclosure, the push of the trigger is able to cause the stopper to stop at the edge of the circuit board, thus it enables the installation and removal of the circuit board without the use of hand or power tools, thereby facilitating and simplifying the process of installing and removing one or more function units associated with the circuit board. Also, since the fixing assembly firmly can secure the circuit board in place, the installation and removal of the function unit are prevented from causing any unwanted displacement of the circuit board.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

The following exemplary embodiments will be described with reference to FIGS. 1-7B. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

Figure 1:
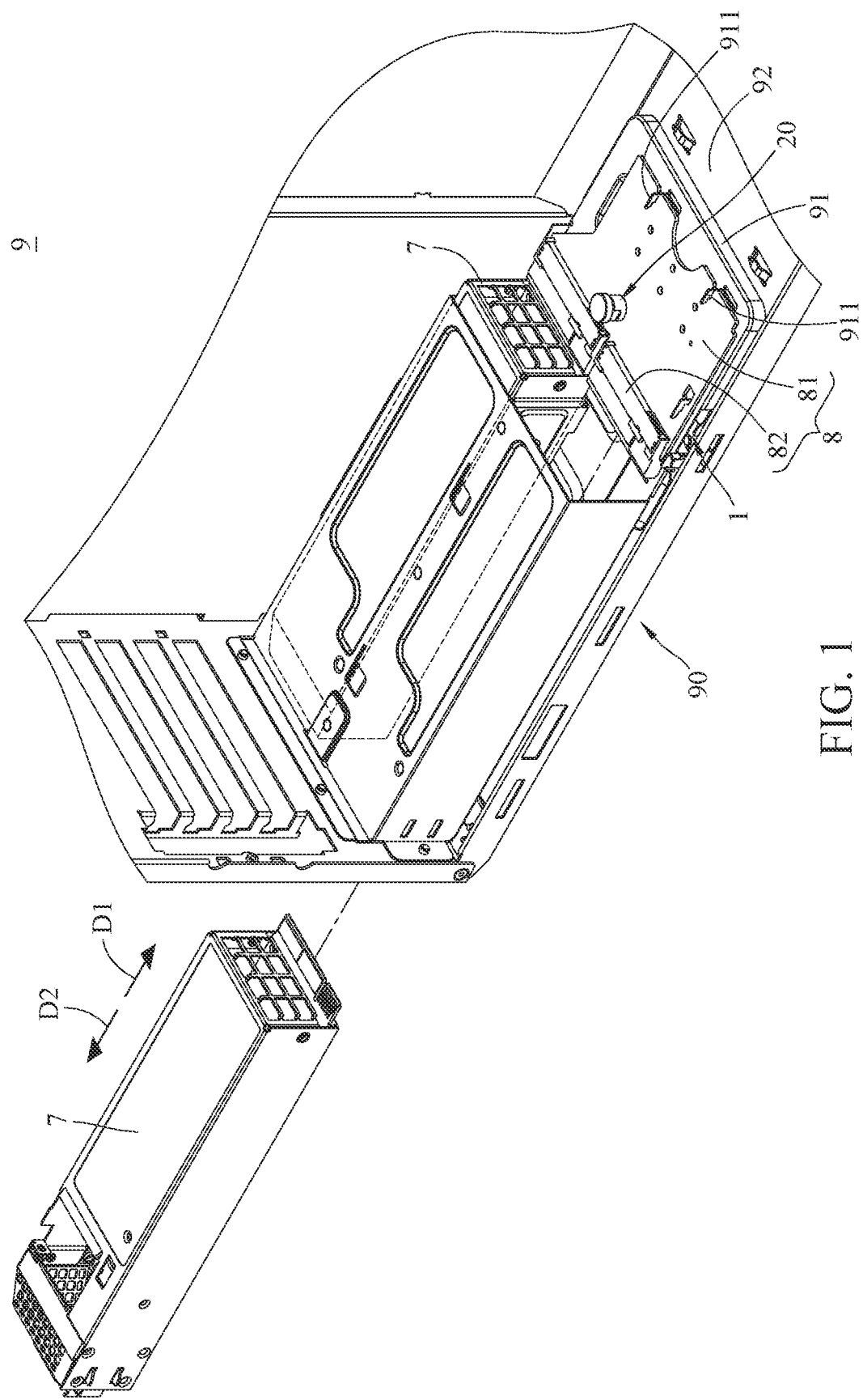
FIG. 1 is a partially enlarged perspective view of an electronic device according to one embodiment of the disclosure.

FIG. 1 depicts an electronic device 9. The electronic device 9 may be, but is not limited to, a desktop computer, a server, or a module accommodated in a desktop computer or a server. As shown, the electronic device 9 may include a casing 90, the casing 90 is suitable to accommodate a circuit board 8. The circuit board 8 is provided for one or more function units 7 to connect. The circuit board 8 may be, but is not limited to, a prober interface board (PIB). The circuit board 8 may include a board part 81 and a connector 82 located at a side of the board part 81. The function unit 7 may be, but is not limited to, an electrical device that is suitable for being connected to the circuit board 8. For example, the function unit 7 may be a power supply unit (PSU). As shown, the function unit 7 is allowed to be inserted into the casing 90 to electrically connect to the connector 82 of the circuit board 8 along a first direction D1; and the function unit 7 is allowed to be electrically disconnected from the connector 82 of the circuit board 8 and removed out of the casing 90 along a second direction D2. The second direction D2 is opposite to the first direction D1.

In more detail, the board part 81 of the circuit board 8 is detachably installed on a support frame 91 of the casing 90. The support frame 91 may have a portion in plate shape suitable for supporting the circuit board 8. At least one limiting portion 911 protrudes outward from the surface of the support frame 91 and is configured to be engaged with at least one engagement slot 813 on the board part 81. Thus, the circuit board 8 is detachably installed on the support frame 91 and can be restricted in multiple directions. In this embodiment, the support frame 91 may be part of a frame capable of accommodating one or more function units 7 and may be fixed to a plate part 92 of the casing 90 by any typical manner (e.g., screws, bolts, or welding). The plate part 92 may be part of any plate-shaped structure (e.g., side plate or bottom plate) of the casing 90. In other embodiments, the support frame may be integrally formed with the casing.

To prevent the removal and installation of the function unit 7 from causing the circuit board 8 to move with respect to the support frame 91, the electronic device 9 includes a fixing assembly 1. The fixing assembly 1 is cooperative with the limiting portions 911 of the support frame 91 so as to prevent the displacement of the circuit board 8 in all directions, thereby securing the position of the circuit board 8 during the installation and removal of the function unit 7. The detail of the fixing assembly 1 is given below.

Figure 2:
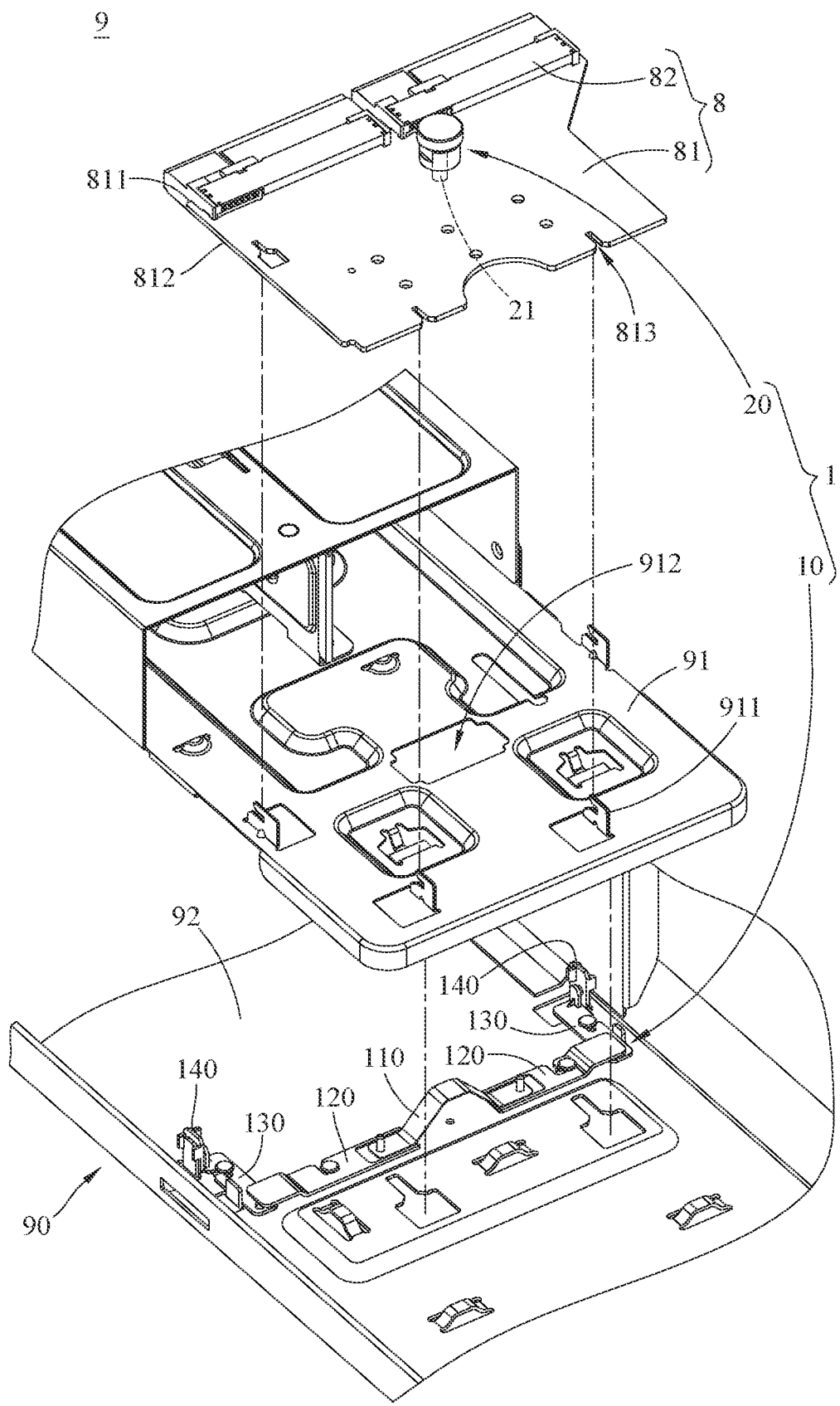
FIG. 2 is a partially enlarged exploded view of an electronic device according to one embodiment of the disclosure.
Figure 3:
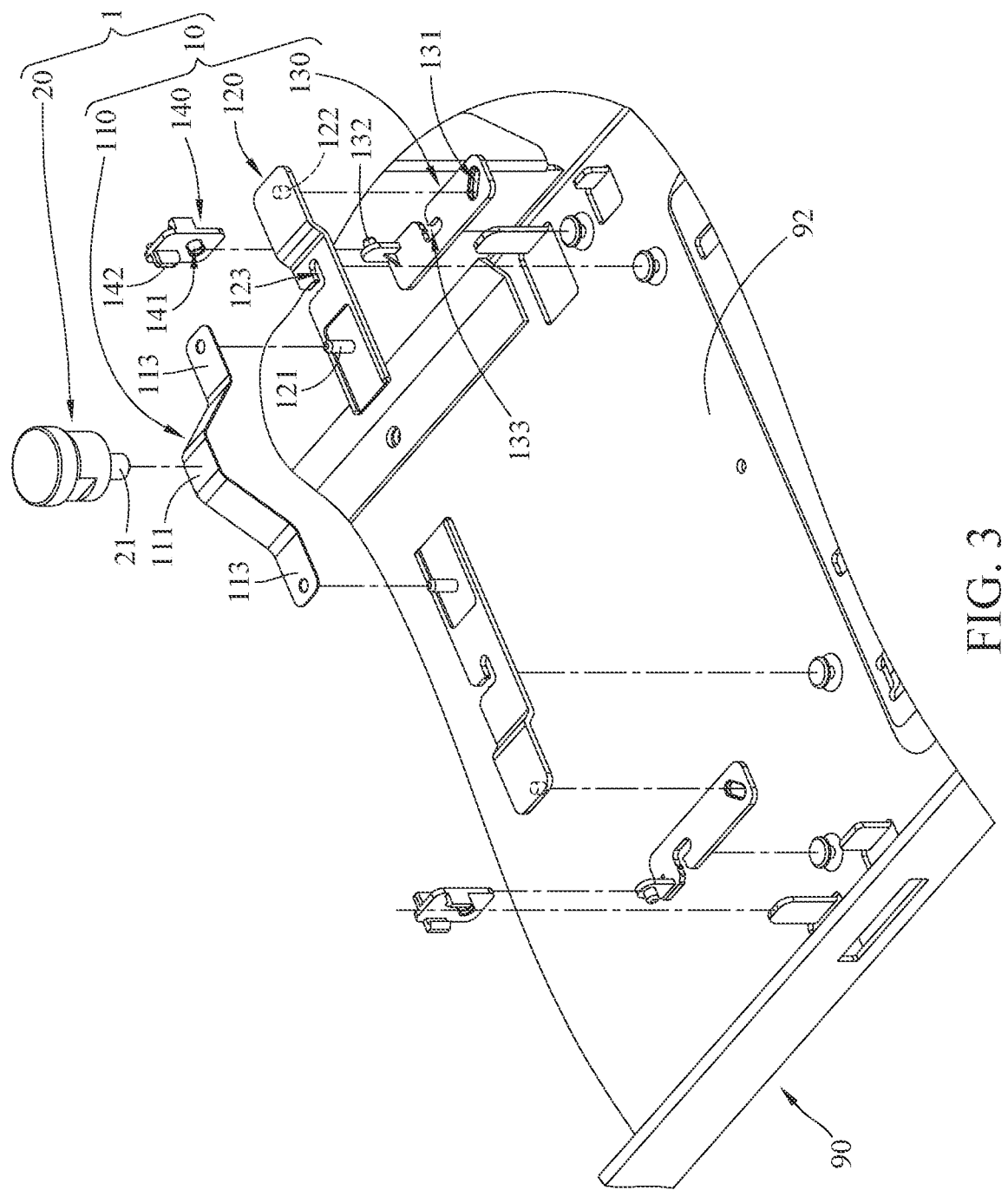
FIG. 3 is an exploded view of a fixing assembly of an electronic device according to one embodiment of the disclosure.
Figure 4:
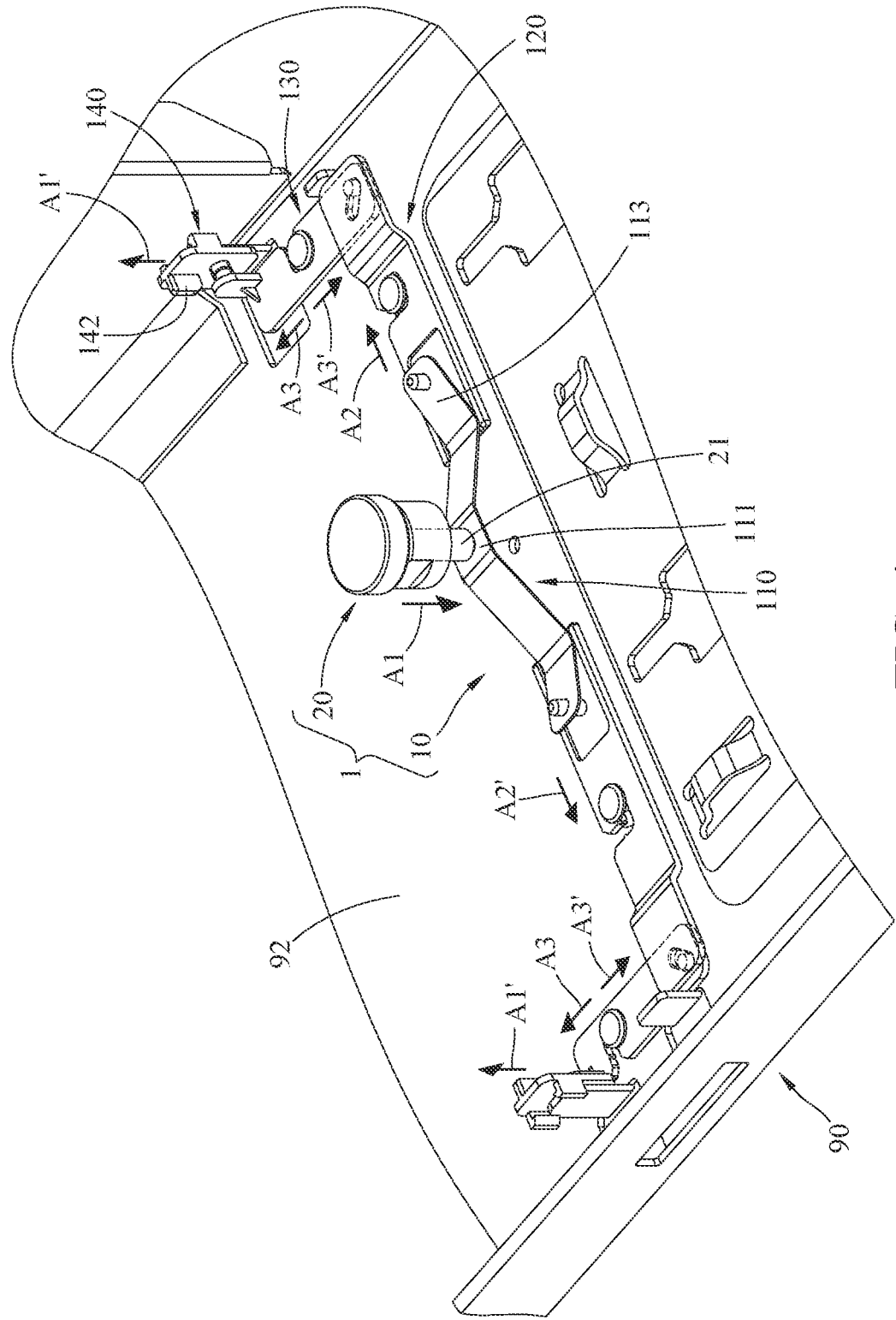
FIG. 4 depicts how a fixing assembly according to one embodiment of the disclosure works.

Referring to FIG. 1 and further referring to FIGS. 2-4, FIG. 2 depicts a partially enlarged exploded view of the electronic device 9, FIG. 3 depicts an exploded view of the fixing assembly 1, and FIG. 4 depicts the operation of the fixing assembly 1. In this embodiment, the fixing assembly 1 may include a linkage mechanism 10 and a trigger 20. The trigger 20 may be, but is not limited to, any suitable typical spring-loaded plunger. The trigger 20 is arranged at a side of the support frame 91 located away from the board part 81 of the circuit board 8 in any suitable manner. As shown, the trigger 20 may include a pin 21 disposed through the board part 81 of the circuit board 8. The pin 21 is connected to a spring (not numbered) located within the trigger 20 so that the pin 21 is retractable with respect to the board part 81. The linkage mechanism 10 is movably arranged on the plate part 92 of the casing 90 and located a side of the support frame 91 located away from the circuit board 8. The trigger 20 is able to cause the linkage mechanism 10 to move using the pin 21 so as to cause one or more components of the linkage mechanism 10 to hold the front edge 811 and the side edge 812 of the board part 81. As a result, the linkage mechanism 10 cooperating with the limiting portions 911 of the support frame 91 is able to restrict any displacement of the circuit board 8 so that the position of the circuit board 8 is firmly secured. The front edge 811 means the side of the circuit board 8 where the connector 82 is located; in other words, the front edge 811 and the connector 82 are located at the same side of the circuit board 8. The side edge 812 means the side adjacent to the front edge 811, thus, the front edge 811 and the side edge 812 are respectively located at different sides of the circuit board 8.

In this embodiment, the linkage mechanism 10 may include a contact component 110, at least one link (e.g., at least one first link 120 and at least one second link 130 shown in the drawings), and at least one stopper 140. The contact component 110 is movably disposed on the plate part 92 of the casing 90. The contact component 110 corresponds to the trigger 20 and therefore is served to be pushed by the pin 21 of the trigger 20. The contact component 110 may be an elastic plate made of any suitable material, thus at least part of the contact component 110 is able to be elastically moved or deformed in a specific direction along with the push of the pin 21 (e.g., the directions indicated by the opposite arrows A1 and A1'). The first links 120 are respectively movably connected to two opposite ends of the contact component 110. Also, the first links 120 are slidable along directions (e.g., the directions indicated by the opposite arrows A2 and A2') substantially perpendicular to the direction indicated by arrow A1 relative to the plate part 92 of the casing 90 since the contact component 110 is elastically deformable. In other words, movable directions of the two opposite sides of the contact component 110 are substantially parallel to movable directions of the first links 120. Each of the second links 130 is movably connected to the end of the respective first link 120 located away from the contact component 110. When the second links 130 are moved by the first links 120 and the contact component 110, the second links 130 are movable relative to the plate part 92 of the casing 90 along directions substantially perpendicular to the directions indicated by arrows A1 and A2 (e.g., the directions indicated by arrow A3 and its opposite). In other words, the movable directions of the first links 120 are substantially perpendicular to movable directions of the second link 130. The stoppers 140 are movably disposed on the plate part 92 of the casing 90. The stoppers 140 are respectively movably connected to ends of the second links 130 located away from the first links 120. When the second links 130 are moved by the first links 120 and the contact component 110, the stoppers 140 are movable relative to the plate part 92 of the casing 90 along directions substantially perpendicular to the directions indicated by arrows A2 and A3 (e.g., the directions indicated by arrows A1 and A1'). In other words, the movable directions of the stoppers 140 are substantially perpendicular to the movable directions of the second links 130. In short, when the pin 21 of the trigger 20 pushes the contact component 110 of the linkage mechanism 10, the stoppers 140 are forced to move in directions opposite to that of the pin 21. This causes the stoppers 140 to move away from the plate part 92 of the casing 90 to stop in front of the front edge 811 of the circuit board 8.

The contact component 110 may include a contact portion 111 and two connecting portions 113. The contact portion 111 is located between the connecting portions 113 and may have a relatively flat surface to receive the push of the pin 21. Thus, a movable direction of the contact portion 111 is substantially parallel to that of the pin 21 of the trigger 20. The support frame 91 may have a through hole 912 arranged between the trigger 20 and the contact component 110, and the through hole 912 exposes the contact component 110 to the pin 21, thereby allowing the pin 21 to reach the contact portion 111. The connecting portions 113 mean the parts of the contact component 110 used to be connected to the first links 120. Correspondingly, the first links 120 may each include a connecting portion 121 at one end thereof. The connecting portion 121 means the part of the first link 120 used to be connected to the connecting portion 113 of the contact component 110. In this embodiment, one of the connecting portion 113 and the connecting portion 121 may be a through hole, and the other may be a post movably inserted into the through hole.

In addition, the first links 120 may each include a connecting portion 122 and a guide portion 123. The guide portion 123 may be a groove extending in the directions indicated by the arrow A2. The guide portion 123 is configured for the insertion of a T-shaped rivet or the like (not numbered) on the plate part 92 and therefore is able to guide the first link 120 to move as indicated by the arrow A2 or A2'. The connecting portion 122 is arranged at another end of the first link 120 and means the part of the first link 120 used to be connected to the second link 130. Correspondingly, the second links 130 may each include a connecting portion 131 at one end thereof. The connecting portion 131 means the part of the second link 130 used to be connected to the connecting portion 122 of the first link 120. In this embodiment, one of the connecting portion 122 and the connecting portion 131 may be a post, and the other may be a groove suitable for the insertion and slide of the post and being at an angle to the directions indicated by arrows A2 and A3. Thus, the movement of the first link 120 is able to cause the second link 130 to move as indicated by the arrow A3 or A3'.

In addition, the second link 130 may each include a connecting portion 132 and a guide portion 133. The guide portion 133 may be a groove extending in the direction indicated by the arrow A3. The guide portion 133 is configured for the insertion of a T-shaped rivet or the like (not numbered) on the plate part 92 and therefore is able to guide the second link 130 to move as indicated by the arrow A3 or A3'. The connecting portion 132 is arranged at another end of the second link 130 and means the part of the second link 130 used to be connected to the stopper 140. Correspondingly, the stoppers 140 may each include a connecting portion 141 at one end thereof. The connecting portion 141 means the part of the stopper 140 used to be connected to the connecting portion 132 of the second link 130. In this embodiment, one of the connecting portion 132 and the connecting portion 141 may be a post, and the other may be a groove suitable for the insertion and slide of the post and being at an angle to the directions indicated by arrows A1' and A3. Thus, the movement of the second link 130 is able to cause the stopper 140 to move as indicated by the arrow A1'. As shown, the movable direction of the contact portion 111 is substantially parallel to the movable direction of the stopper 140 and is substantially perpendicular to that of the first link 120 and the second link 130.

As such, the pin 21 of the trigger 20 is able to cause the stoppers 140 to stop in front of the side edges 812 of the board part 81. Also, each stopper 140 may include a stopping protrusion 142 substantially extending towards the other stopper 140 in the directions indicated by the arrows A2 and A2'. The stopping protrusions 142 are configured to stop in front of the front edge 811 of the board part 81 when being triggered by the pin 21 of the trigger 20. As a result, the stoppers 140 and the limiting portions 911 of the support frame 91 are able to restrict the circuit board 8 in all directions; in other words, any unwanted displacement of the circuit board 8 is prevented by the cooperation of the stoppers 140 and the limiting portions 911 of the support frame 91.

Figure 5A:
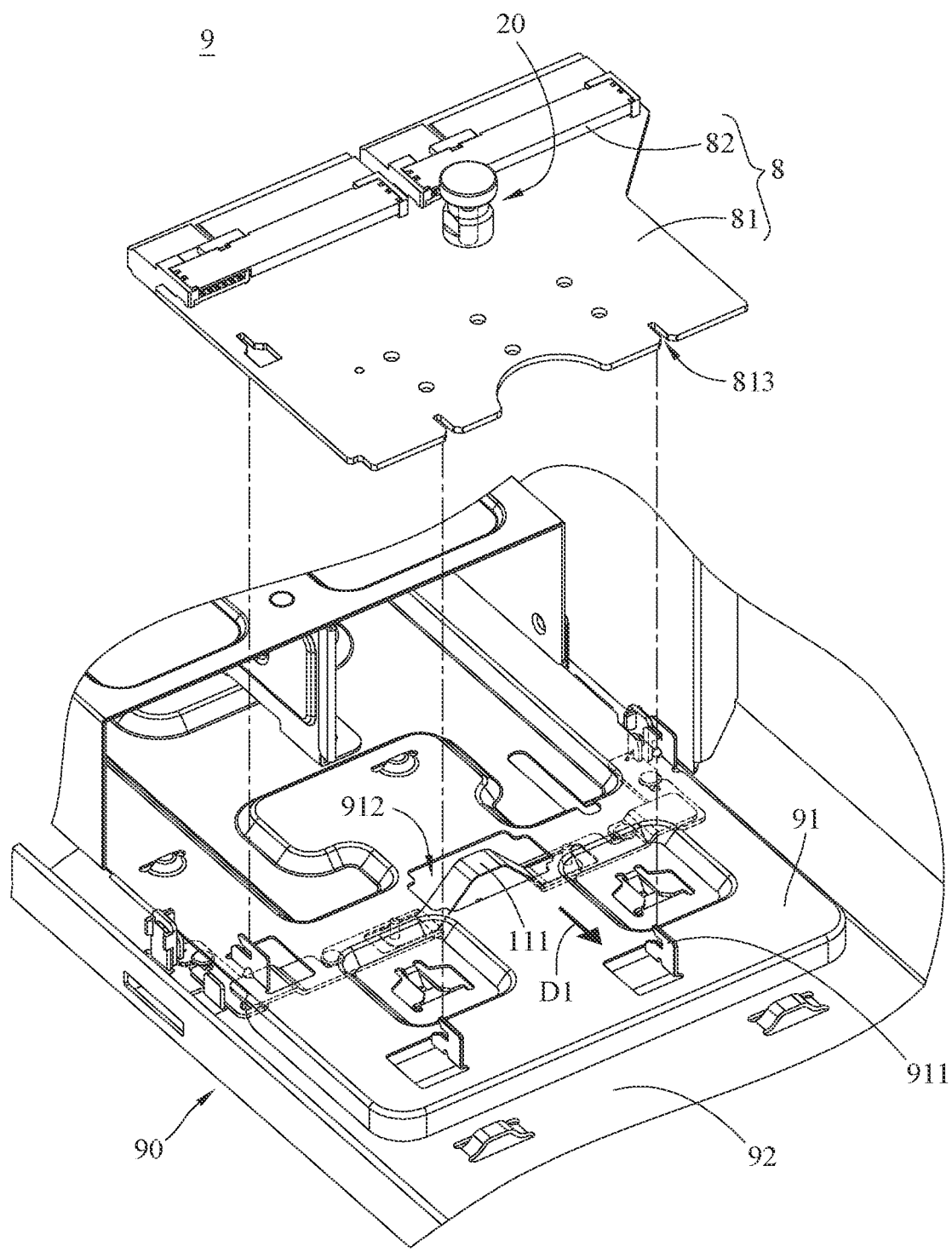
FIGS. 5A-5C depict how a circuit board is installed to an electronic device according to one embodiment of the disclosure.

Then, referring to FIGS. 5A-5C, the installation of the circuit board 8 with the help of the fixing assembly 1 is described in detail below. Firstly, in FIG. 5A, user can place the circuit board 8 onto the support frame 91 and push it towards the first direction D1. When doing so, the pin 21 can be retracted into the board part 81 of the circuit board 8 to prevent from having interference with the support frame 91. By doing so, in FIG. 5B, the limiting portions 911 of the support frame 91 are engaged with the engagement slots 813 of the board part 81, such that the limiting portions 911 restrict the circuit board 8 from moving in the first direction D1 and directions perpendicular to the first direction D1.

Then or meanwhile, the pin 21 is released so that the pin 21 penetrates through the through hole 912 of the support frame 91 to push the contact portion 111 of the contact component 110 of the linkage mechanism 10. As discussed above, the push of the pin 21 to the contact portion 111 is able to cause the first links 120 and the second links 130 to move the stoppers 140 towards the direction away from the plate part 92 of the casing 90, such that the stoppers 140 and their stopping protrusions 142 stop at the front edge 811 and the side edges 812 of the board part 81 and thereby restricting the circuit board 8 from moving in the second direction D2.

Figure 5B:
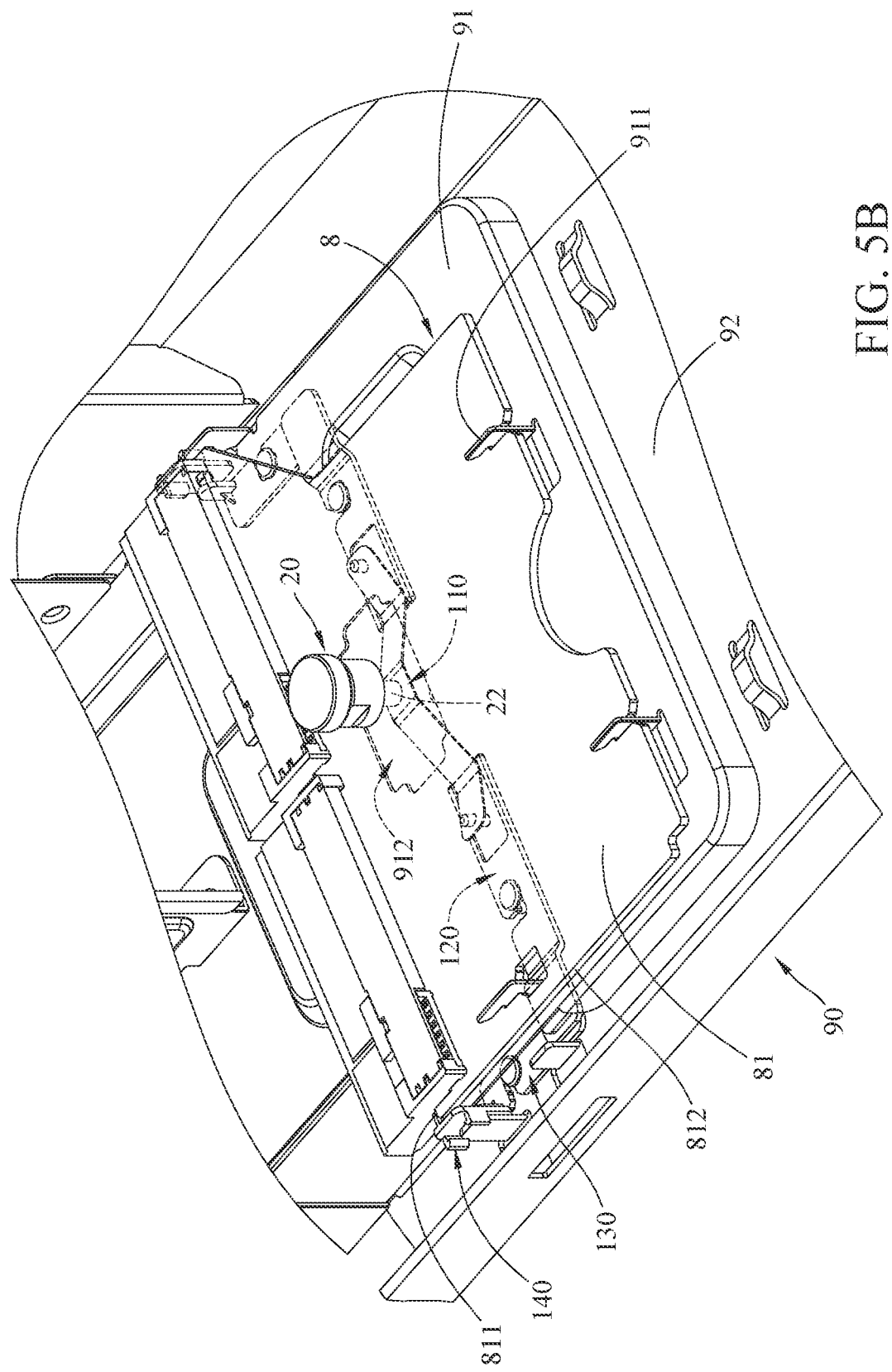
Figure 5C:
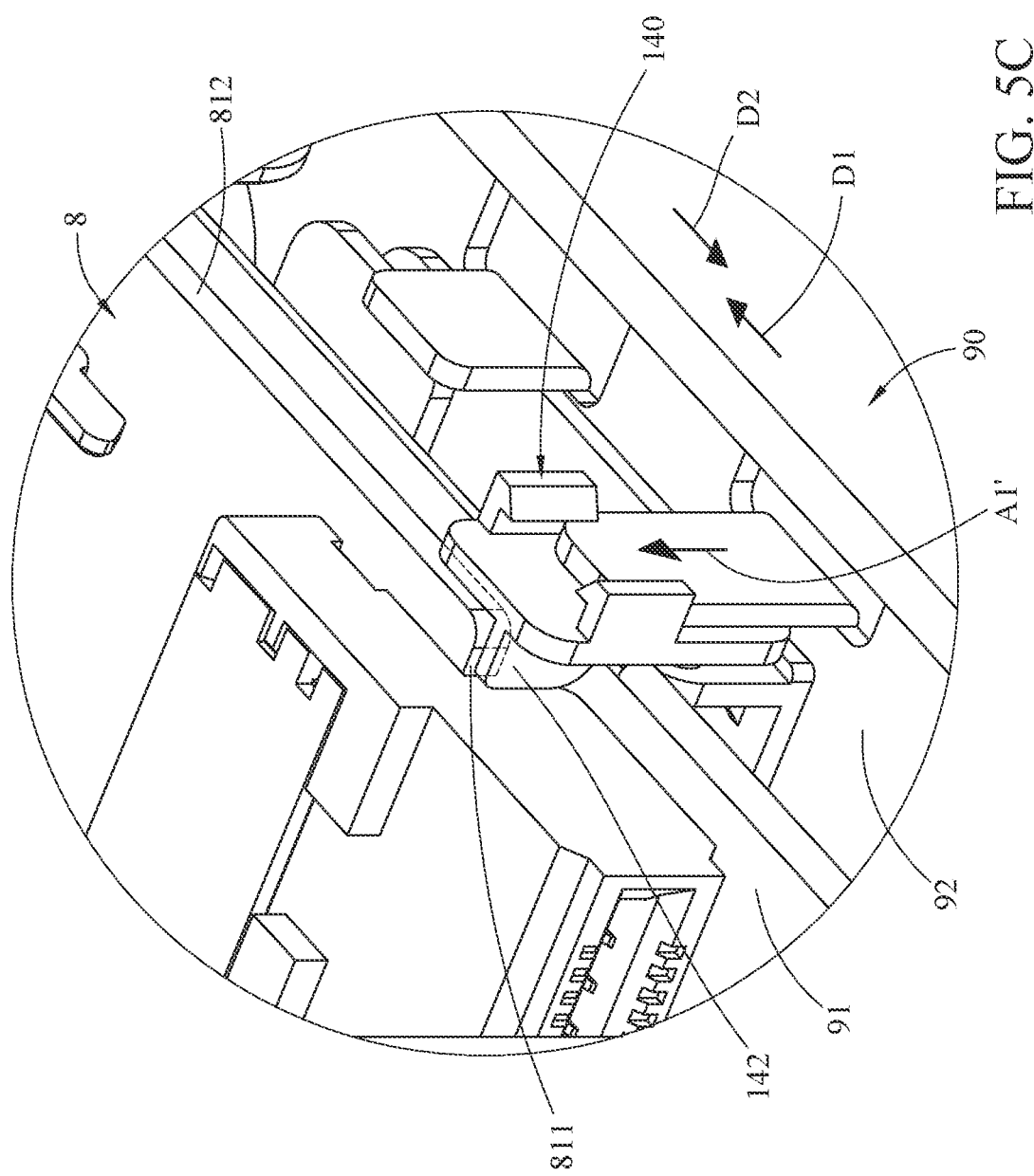

As a result, as can be seen in FIGS. 5B and 5C, the limiting portions 911 of the support frame 91 and the stoppers 140 and the stopping protrusions 142 thereof hold are able to restrict the circuit board 8 from moving in all directions, such that any unwanted displacement of the circuit board 8 due to external force is prevented. As shown, with the help of the fixing assembly 1, the installation of the circuit board 8 may only involve simple steps; that is, placing and moving the circuit board 8 and then releasing the trigger 20. Also, the fixing assembly 1 secures the position of the circuit board 8, thus any force caused by the installation and removal of the function unit 7 (e.g., the first direction D1 and the second direction D2 shown in FIG. 1) is prevented from moving the circuit board 8.

Understandably, regarding the removal of the circuit board 8, it may only involve simple steps, such as retracting the pin 21 to make the contact component 110 elastically restore to its original shape and thereby releasing the stoppers 140 from the front edge 811 of the board part 81. By doing so, the circuit board 8 is allowed to be removed in the second direction D2.

Note that the aforementioned trigger is exemplary. Any suitable means that can enable the above status switch of the linkage mechanism can be employed as the trigger of the disclosure. For example, in other embodiments, the trigger may be a bolt or pin which can be disposed through the circuit board to push the contact component of the linkage mechanism in manual manner.

The aforementioned linkage mechanism is also exemplary and not intended to be limiting. Some other exemplary linkage mechanisms of the disclosure that are given below. And for the purpose of simple illustration, the following paragraphs are focus on the differences of embodiments and may omit descriptions of the components that are the same as in the previous embodiments.

Figure 6A:
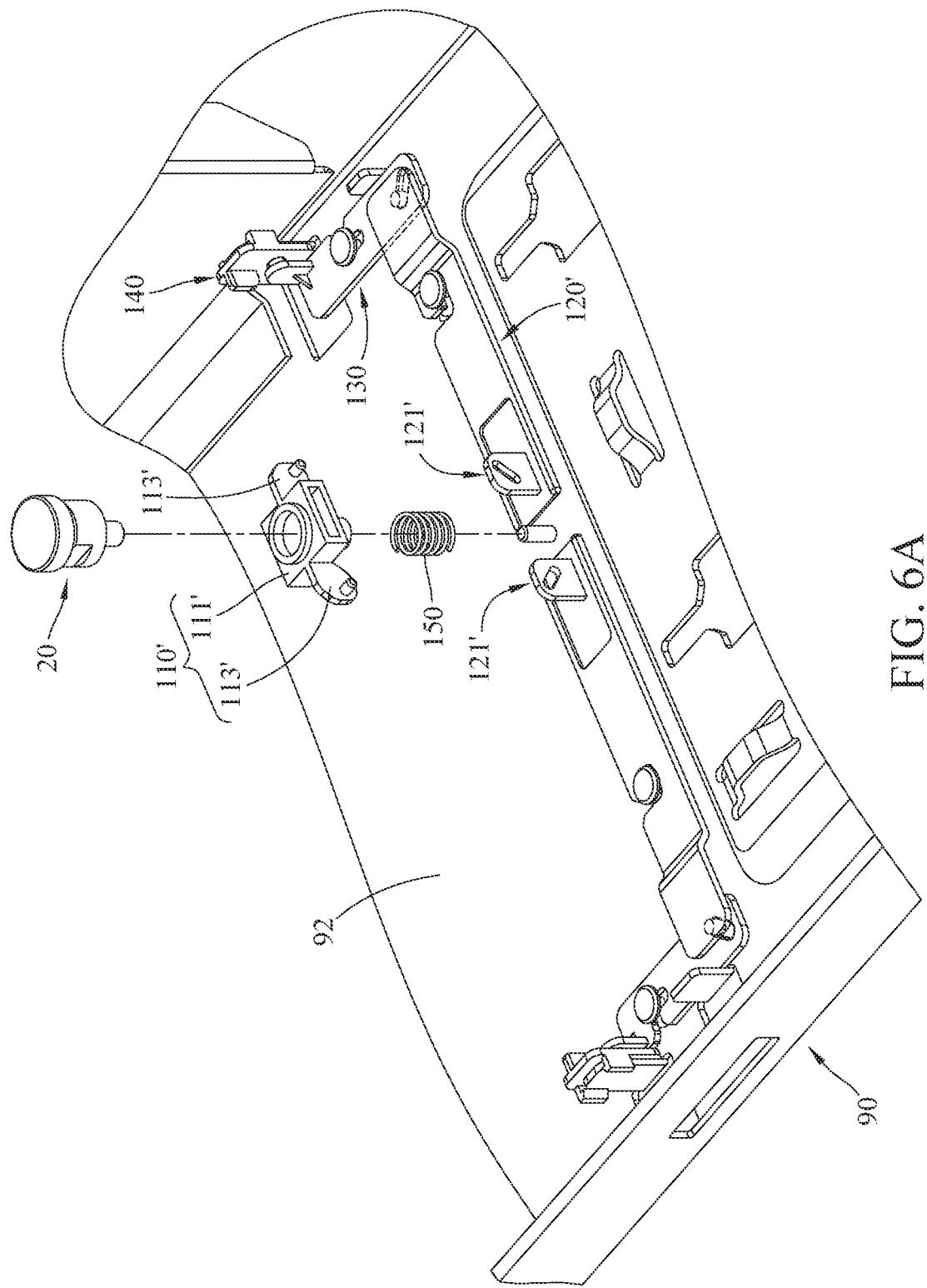
FIG. 6A is an exploded view of a fixing assembly according to another embodiment of the disclosure.
Figure 6B:
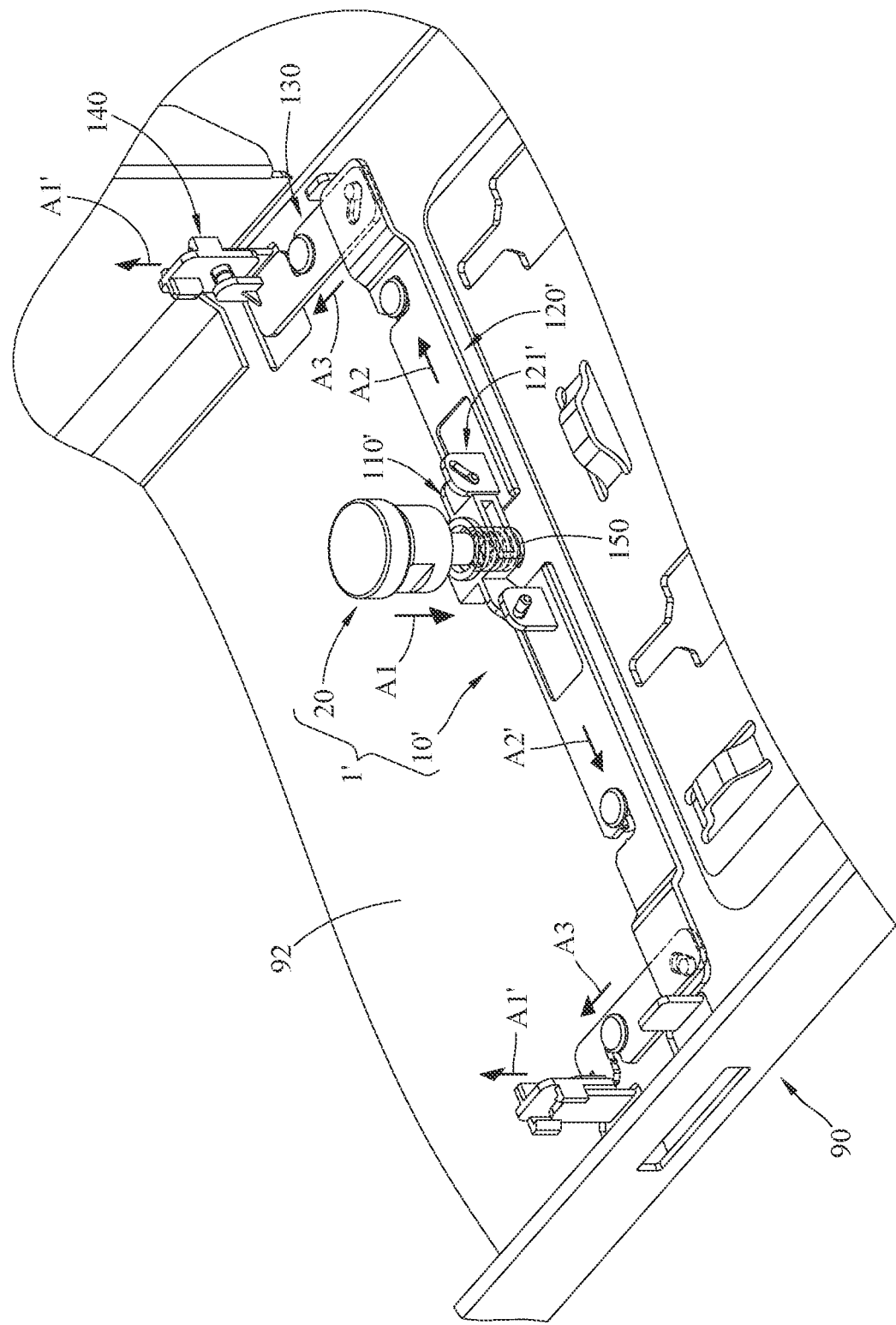
FIG. 6B is a perspective view of a fixing assembly according to another embodiment of the disclosure.

Referring to FIGS. 6A-6B, another embodiment provides a fixing assembly 1'. In a linkage mechanism 10' of the fixing assembly 1', an elastic component 150 may be disposed at a side of a contact portion 111' of a contact component 110' so as to force the contact component 110' to move towards the trigger 20. In specific, the elastic component 150 may be, but is not limited to be, any suitable compression spring, the elastic component 150 may be arranged between and clamped by the contact portion 111' of the contact component 110' and the plate part 92 of the casing 90 and thus constantly forcing the contact portion 111' to move away from the plate part 92 of the casing 90 (i.e., forcing the contact portion 111' to move towards the trigger 20). In addition, first links 120' may each have a connecting portion 121' being a groove at an angle to the directions indicated by the arrows A1 and A2, and the contact component 110' may have a connecting portion 113' being a post suitable for sliding along the groove. In such an arrangement, the trigger 20 is also able to cause the stopper 140 to move in the direction indicated by the arrow A1' when pushing the contact component 110', thereby preventing any displacement of the circuit board 8.

Figure 7A:
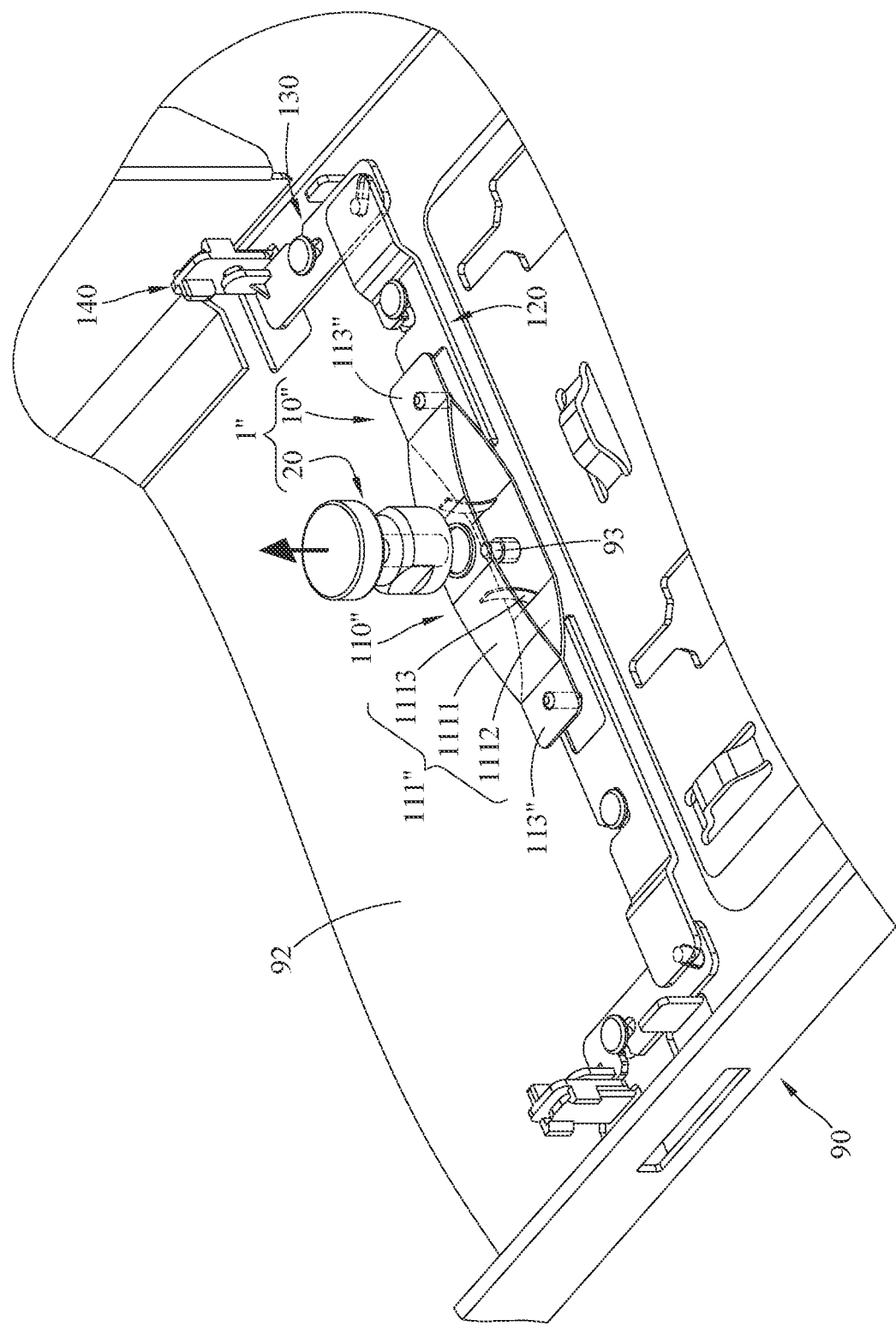
FIG. 7A is a perspective view of a fixing assembly according to still another embodiment of the disclosure.
Figure 7B:
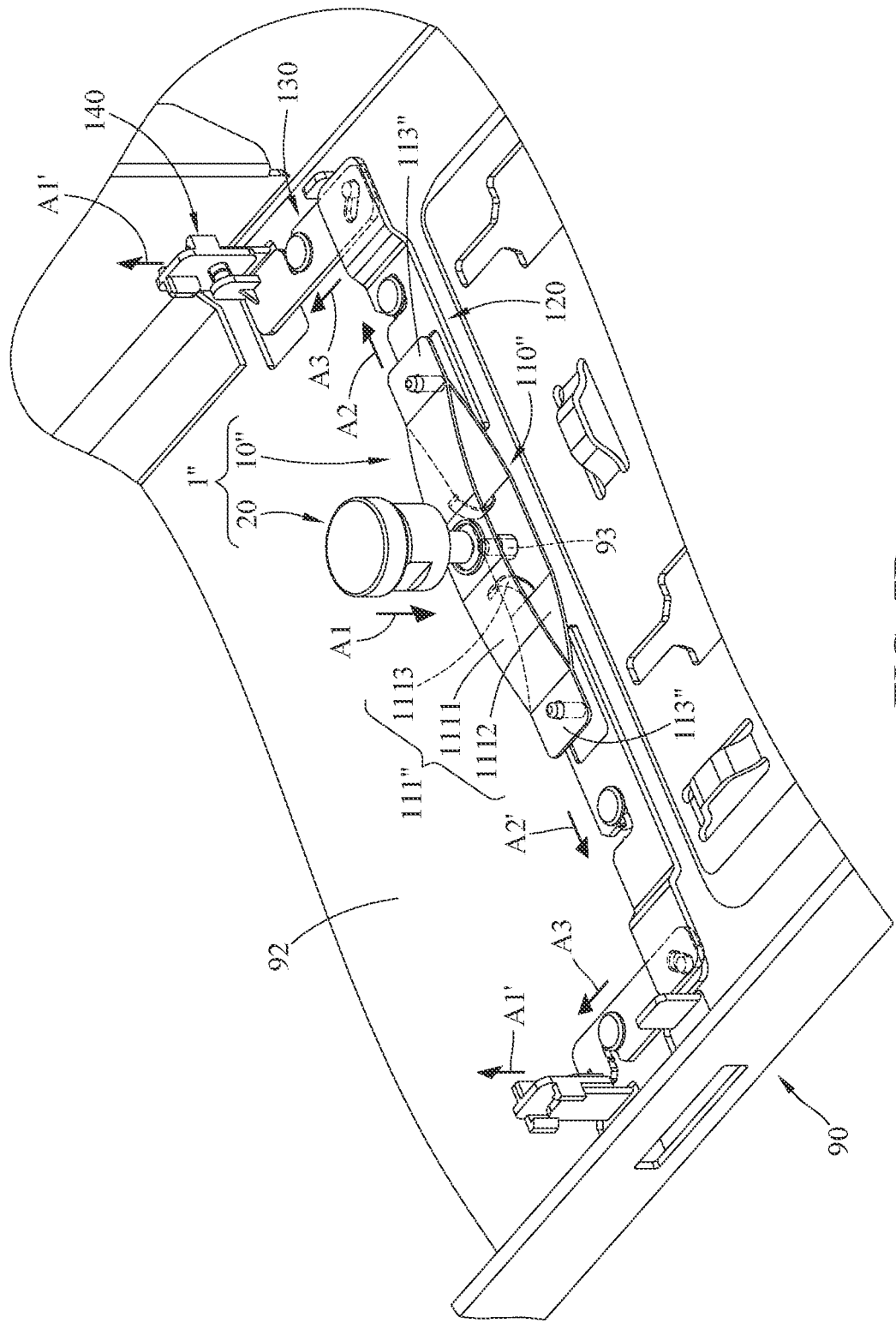
FIG. 7B depicts how a fixing assembly according to still another embodiment of the disclosure works.

Referring to FIGS. 7A-7B, another embodiment provides a fixing assembly 1". In a linkage mechanism 10" of the fixing assembly 1", a contact component 110" may include a first elastic plate 1111, a second elastic plate 1112, and at least one elastic support 1113. Two opposite ends of the first elastic plate 1111 are respectively connected to two opposite ends of the second elastic plate 1112 so as to form connecting portions 113" at two opposite ends of the contact component 110", and the central areas of the first elastic plate 1111 and the second elastic plate 1112 are spaced apart from each other. The elastic supports 1113 are arranged between and clamped by the first elastic plate 1111 and the second elastic plate 1112 so as to support and restore the first elastic plate 1111 and the second elastic plate 1112 to their original shapes. Optionally, a post 93 protruding from the support frame 91 is disposed through the connecting portions 113" so as to stabilize the contact component 110".

In such an arrangement, the push of the trigger 20 in the direction indicated by the arrow A1 to the first elastic plate 1111 of the contact component 110" can force the first elastic plate 1111, the second elastic plate 1112, and the elastic supports 1113 to elastically deform, causing the connecting portions 113" to move towards the directions indicated by the arrows A2 and A2'. This also can enable the movement of the stoppers 140 in the direction indicated by the arrow A1' and thereby preventing any displacement of the circuit board 8.

According to the fixing assembly and the electronic device as discussed in the above embodiments, the support frame is able to restrict the displacement of the circuit board in specific directions when engaging the circuit board with the limiting portions, meanwhile, the release of the trigger is able to cause the stoppers of the linkage mechanism to stop at the front edge of the circuit board so as to restrict the displacement of the circuit board in other directions. As such, the circuit board is allowed to be installed in place without the use of hand or power tools and thereby facilitating and simplifying the processes of installing and removing one or more function units associated with the circuit board. Also, since the fixing assembly can firmly secure the circuit board in place, the installation and removal of the function unit are prevented from causing any displacement of the circuit board.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fixing assembly, adapted for a support frame and a plate part of a casing, the support frame being disposed on the plate part, the fixing assembly comprising: a contact component, adapted to be movably disposed on the plate part; at least one stopper, adapted to be movably disposed on the plate part and movable by the contact component; and a trigger, configured to penetrate through the support frame to push the contact component so as to force the at least one stopper to move away from the plate part; and wherein the fixing assembly further comprises at least one link, the contact component is connected to the at least one stopper via the at least one link; wherein when the trigger pushes the contact component, a movable direction of a contact portion of the contact component is substantially parallel to a movable direction of the at least one stopper.

2. The fixing assembly according to claim 1, wherein the movable direction of the contact portion of the contact component is substantially perpendicular to a movable direction of the at least one link.

3. The fixing assembly according to claim 2, wherein the at least one link comprises at least one first link and at least one second link, the contact component is connected to the at least one second link via the at least one first link, the at least one first link is connected to the at least one stopper via the at least one second link, a movable direction of the at least one first link is substantially perpendicular to a movable direction of the at least one second link.

4. The fixing assembly according to claim 1, wherein the contact component is an elastic plate.

5. The fixing assembly according to claim 1, further comprising an elastic component disposed at a side of a contact portion of the contact component and configured to force the contact portion to move toward the trigger.

6. The fixing assembly according to claim 1, wherein the contact component comprises a first elastic plate and a second elastic plate, two opposite ends of the first elastic plate are respectively connected to two opposite ends of the second elastic plate, and a central part of the first elastic plate is spaced apart from a central part of the second elastic plate.

7. The fixing assembly according to claim 6, wherein the contact component further comprises at least one elastic support located between and clamped by the first elastic plate and the second elastic plate.

8. The fixing assembly according to claim 1, wherein the trigger is a spring-loaded plunger adapted to be disposed on a circuit board removably disposed on the support frame, the trigger comprises a pin configured to be movably disposed through the circuit board and the support frame so as to push the contact component.

9. An electronic device, comprising: a casing, comprising a support frame and a plate part, wherein the support frame is disposed on the plate part; and a fixing assembly, comprising: a contact component, movably disposed on the plate part; at least one stopper, movably disposed on the plate part and movable by the contact component; and a trigger, penetrating through the support frame to be configured to push the contact component so as to force the at least one stopper to move away from the plate part; and wherein the fixing assembly further comprises at least one link, the contact component is connected to the at least one stopper via the at least one link; wherein when the trigger pushes the contact component, a movable direction of a contact portion of the contact component is substantially parallel to a movable direction of the at least one stopper.

10. The electronic device according to claim 9, wherein the movable direction of the contact portion of the contact component is substantially perpendicular to a movable direction of the at least one link.

11. The electronic device according to claim 10, wherein the at least one link comprises at least one first link and at least one second link, the contact component is connected to the at least one second link via the at least one first link, the at least one first link is connected to the at least one stopper via the at least one second link, a movable direction of the at least one first link is substantially perpendicular to a movable direction of the at least one second link.

12. The electronic device according to claim 9, wherein the contact component is an elastic plate.

13. The electronic device according to claim 9, further comprising an elastic component disposed at a side of a contact portion of the contact component and configured to force the contact portion to move toward the trigger.

14. The electronic device according to claim 9, wherein the contact component comprises a first elastic plate and a second elastic plate, two opposite ends of the first elastic plate are respectively connected to two opposite ends of the second elastic plate, and a central part of the first elastic plate is spaced apart from a central part of the second elastic plate.

15. The electronic device according to claim 14, wherein the contact component further comprises at least one elastic support located between and clamped by the first elastic plate and the second elastic plate.

16. The electronic device according to claim 9, wherein the trigger is a spring-loaded plunger adapted to be disposed on a circuit board removably disposed on the support frame, the trigger comprises a pin configured to be movably disposed through the circuit board and the support frame so as to push the contact component.

17. The electronic device according to claim 9, wherein the support frame has a through hole located between a pin of the trigger and the contact component.

18. The electronic device according to claim 9, wherein the support frame has at least one limiting portion protruding thereon, the at least one limiting portion is configured to be engaged with at least one engagement slot of a circuit board removably disposed on the support frame.

\* \* \* \* \*